United States Patent [19]

Cook et al.

[11] Patent Number: 4,818,643

[45] Date of Patent: Apr. 4, 1989

[54] MATERIALS FOR ELECTRICAL DEVICES

[75] Inventors: John A. Cook, Faringdon; George B. Park; Robert H. McLoughlin, both of Swindon, all of England

[73] Assignee: Raychem Limited, Swindon, United Kingdom

[21] Appl. No.: 942,911

[22] Filed: Dec. 17, 1986

Related U.S. Application Data

[63] Continuation of Ser. No. 780,546, Sep. 26, 1985, abandoned, which is a continuation-in-part of Ser. No. 618,104, Jun. 7, 1984, abandoned, and Ser. No. 675,909, Nov. 28, 1984, abandoned.

[30] Foreign Application Priority Data

Dec. 15, 1983 [GB] United Kingdom ................. 8333388
Dec. 13, 1984 [EP] European Pat. Off. ......... 84308708.1

[51] Int. Cl.$^4$ .............................................. H01M 6/16
[52] U.S. Cl. ................................... 429/188; 429/192; 252/62.2
[58] Field of Search ...................... 429/188, 192, 217; 252/62.2

[56] References Cited

U.S. PATENT DOCUMENTS 4,060,673 11/1977 Dey ...................................... 429/192
4,121,022 10/1978 Dick et al. ........................... 429/204
4,168,352 9/1979 Dick et al. ........................... 429/204

FOREIGN PATENT DOCUMENTS 145231 6/1985 European Pat. Off. .
146246 6/1985 European Pat. Off. .
2442513 6/1980 France .
WO80/64756 6/1980 PCT Int'l Appl. .

OTHER PUBLICATIONS

Kelly et al., "Polyethylene Oxide Electrolytes for Operation at Nearly Room Temperature", *Journal of Power Sources* vol. 14, #1, pp. 13–21, Jan. 1985.
Thermoplastic Processing: Calendering, Extrusion, and Injection Molding, Union Carbide brochure F–43343.
Granada, "How Things Work", pp. 56–59 (1972).

*Primary Examiner*—Brian E. Hearn
*Assistant Examiner*—Stephen J. Kalafut
*Attorney, Agent, or Firm*—Herbert G. Burkard; Simon J. Belcher

[57] ABSTRACT

Melt-extruded polymeric electrolyte material for electrochemical power cells may be coextruded with other components of the cell; notably a lithium metal anode.

10 Claims, 4 Drawing Sheets

MATERIALS FOR ELECTRICAL DEVICES

CROSS-REFERENCE TO RELATED APPLICATIONS

This application is a continuation, of application Ser. No. 780,546, filed Sept. 26, 1985, abandoned which is a continuation-in-part of application Ser. No. 618,104, filed June 7, 1984 and application Ser. No. 675,909, filed Nov. 28, 1984, both abandoned the disclosures of which are incorporated by reference herein.

BACKGROUND OF THE INVENTION

This invention relates to electrolyte and electrode materials for electrochemical current-generating cells, hereinafter referred to as electrochemical power cells.

Some electrical components, for example some electrode materials, are sensitive insofar as they are difficult to handle during manufacture of electrical devices owing to physical weakness or high chemical reactivity, which may necessitate inconvenient handling procedures and/or special conditions such as dry room assembly. Examples of such sensitive materials include alkali metals and alkaline earth metals, notably lithium metal electrodes for lithium cells. In one kind of such cells, the electrodes are assembled with sheets of polymer compositions which are inherently ionically conductive, often in liquid-free form commonly known as "polymeric electrolytes".

Lithium metal is difficult to roll into thin strips for use as an electrode, and U.S. Pat. No. 3,721,113 describes a method of alleviating this difficulty by rolling the lithium between smooth (surface asperities less than one micron) polymeric surfaces having sufficiently low critical surface tension to prevent adhesion to the lithium. The polymer may be a coating on the surface of rolls used to roll the lithium, or may be in the form of sheeting enclosing or facing the lithium, which does not adhere to the lithium and is peeled off the lithium strip after rolling. While this method facilitates the rolling operation, which produces the thin lithium strip, it does not improve the efficiency of assembling the delicate lithium strip into electrical devices.

Numerous variations of the materials and structure of individual cell electrodes have previously been described, with the emphasis on the chemical and electrical performance of the materials and with little attention to the assembly process itself. For example, British Patent No. 1533279 describes the use of an adherent thin coating of a vinyl polymer film on the surface of lithium strip electrodes for lithium/thionyl chloride cells to prevent electrode passivation, which tends to occur on storage of that particular kind of cell. The vinyl polymer film is insoluble in the thionyl chloride and must not be degraded or decomposed in the presence of the same. It must be sufficiently thin to permit ion transfer between the lithium and the thionyl chloride as required for current flow in operation of the cell. It is stated, though not demonstrated in the examples of the patent, that the vinyl polymer film may also serve as the sole electrode separator of the cell or may permit the use of a thinner separator than would normally be required. Somewhat thicker films of the vinyl polymer are recommended for that purpose, but it is made clear that the ion transfer needed for acceptable electrical performance of the cell will be adversely affected by thus increasing the film thickness. Electrode separators of polystyrene are described in U.S. Pat. No. 4,315,602 for alkaline cells, the separators again being necessarily thin enough to permit ion transfer.

French Patent No. 7832978 (Publication No. 2442513) describes preparation of polymeric electrolyte films and their application to reactive metal electrodes by techniques such as solvent casting or pressure lamination of the polymeric film onto the metal or flowing the molten metal onto the polymer film and cooling.

DETAILED DESCRIPTION OF THE INVENTION

Figure 1:
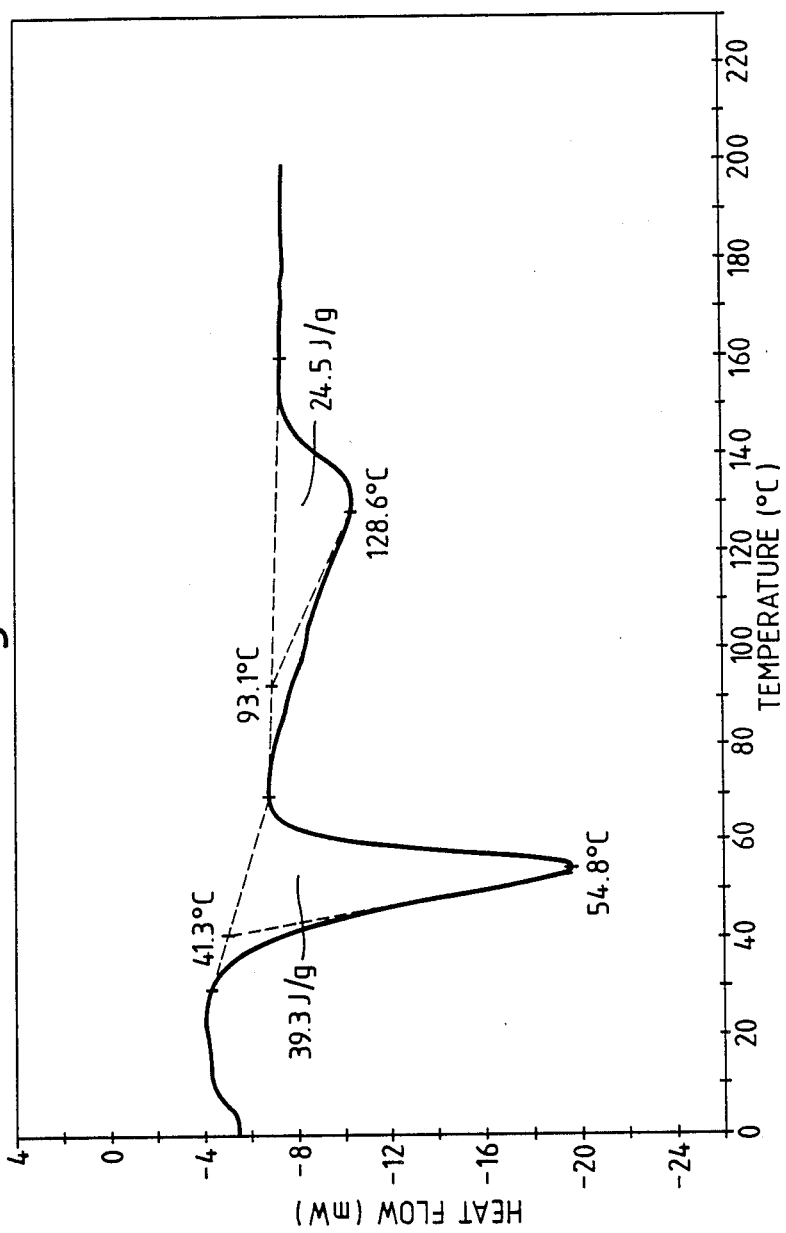
FIGS. 1, 3, and 4 are DSC traces of materials of this invention.

The present invention provides articles and processes whereby significant improvements in electrical power cell assembly can be achieved, as hereinafter described.

In its broadest aspects, the invention provides melt extruded polymeric electrolyte materials and/or melt extruded cathode materials for electrochemical power cells. Either or both of these may be extruded onto other components of a cell, either sequentially or in some cases by coextrusion, for example to form a lithium cell in which a lithium anode is encapsulated in polymeric electrolyte with extruded cathode material and a current collector in contact with the electrolyte. Metallic anodes of suitable meltinq point, such as lithium, may advantageously be coextruded with the electrolyte and other components.

The invention can thus provide an advantageous article comprising sensitive electrode material carrying an extruded, preferably flexible, layer of polymeric electrolyte material by which is meant material which is inherently capable of sufficient ionic conductivity to provide an electrolyte, and preferably also carrying an extruded cathode layer in contact with the electrolyte. Preferably, the article is in a form suitable for feeding to automatic equipment capable of assembling the said device. The ionically conductive electrolyte layer and the cathode layer are preferably applied to the sensitive material in a continuous process, which may preferably also include the aforementioned automatic assembly into electrical devices.

This aspect of the invention accordingly provides a method of making an electrochemical power cell comprising melt-extruding polymeric electrolyte material onto another component to be incorporated in the cell.

The protective encapsulation of sensitive material by the flexible extruded layer(s) permits the development of assembly processes which conveniently include the step of deforming the sensitive electrode materials while protected by the extruded material, for example to reduce the thickness of the electrode material, and/or the step of arranging it in a desired form such as a coiled electrode, as will be further described hereinafter. The invention includes such deformed articles whether or not in a feedable form. For this purpose, the electrode material may advantageously be a metal which is malleable under temperatures and pressures which do not unacceptably damage the extruded layer(s).

The realisation that the previously unknown extrusion of the polymeric electrolyte and the cathode material can be used to form the active components of an electrochemical power cell leads to important processing advantages. Adherent extruded layers are preferred, for which purpose the or each layer may have suitable adhesion-promoting surface properties, such as surface asperities greater than one micron. The feedable article is preferably in the form of an elongate strip, preferably of sufficient length to make a plurality of the said electrical devices.

The or each layer of extruded material is preferably "able to survive" mechanical deformation of the electrode material in the sense that it will retain its integrity and maintain a useful degree of protection both against mechanical damage and against contamination of the electrode material after a significant amount of deformation, for example for the aforementioned purposes. The precise amount of deformation which the protective material must survive will be a matter of common-sense for practical readers. Brittle layers which would crack so as to reduce the protection unacceptably are accordingly excluded, except for end uses where substantial flexibility is not required. Materials which would react unacceptably in other ways, either chemically or physically, for example very thin layers which would become unacceptably scuffed or torn, are of course to be avoided.

The extruded electrolyte is capable of sufficient ionic conductivity to provide an electrolyte, preferably independent of the action of liquid.

It is an advantage of the present invention that the extruded materials will provide protection against contamination of the electrode material. This is especially advantageous in connection with electrode materials which may react violently with certain contaminants, for example alkali metals with water, since the protective material will reduce the likelihood of violent reaction.

The extruded material may thus provided a unitary pre-assembled electrical device such as a cell, thus eliminating some of the problems of handling and aligning electrodes, current collectors and other components during the assembly of the electrical devices, and facilitating automated processing.

It will be understood that the sensitive electrode material may require protection for various reasons, for example materials which are subject to attack by atmospheric gases or moisture during storage; materials which may react prematurely with liquid with which they may come into contact during assembly materials which are subject to poisoning by contaminants during storage; and materials which lack physical strength or integrity and thus require protection from physical damage. The invention is especially useful for materials which require physical protection owing to physical weakness, e.g. lithium metal.

It is a further advantage of the present invention that the processes can apply the extruded materials continuously and can therefore readily be integrated into a system for assembling successive portions of the article into a succession of the electrical devices as aforesaid, preferably automatically and continuously. The advantages of such an automated process over the piece-by-piece hand assembly methods hitherto used in the absence of the articles according to this invention, especially for alkali metal or alkaline earth metal electrode materials, will be appreciated.

Pre-extruded films of electrolyte and/or cathode materials according to this invention can be assembled with the opposing electrode material and other components of the electrical device, but the preferred direct extrusion polymeric electrolyte material reduces the difficulties which are encountered in handling and aligning separate layers of materials, especially with reactive metals such as alkali metals or alkaline earth metals.

This invention is especially useful in relation to reactive metal electrodes such as alkali metal or alkaline earth metal electrodes, especially lithium electrodes for lithium cells. Production of thin sheet electrodes of these and other materials can be facilitated by deforming the electrode material, for example by rolling, while in contact with the extruded layer(s) so as to increase its surface area, e.g. to decrease the thickness of the electrode material or otherwise alter its form or surface configuration. In this way, thin sheets of lithium, for example of about 0.075 millimeters thickness, which would otherwise be difficult and expensive to make and handle, can be produced from more readily available 0.25 millimeter strip. The extruded material may be deformed, e.g. stretched, so as to enhance its function in the device, e.g. its ability to provide an electrode separator and/or electrolyte. This may be useful for extruded materials which require permeation by liquid in order to provide adequate ionic conductivity. However, substantially dry materials are preferred.

The polymeric electrolyte of the invention may comprise other materials in addition to the salt-loaded polymer. These materials may advantageously be mixed into the polymer during the blending process. Melt blending techniques are particularly suitable for mixing the materials of the electrolyte because of the high homogeneity of the mixtures produced thereby. Materials may be selected that provide one or more functions, but it is, of course, important that the materials are both miscible with the electrolyte, and chemically compatible with the other components in the cell with which they will come into contact, for example a lithium anode. It is particularly advantageous to add to the polymer a plasticising agent to inhibit or substantially to prevent the change in morphology of the polymer from the amorphous phase in which it exists when molten, to a phase in which it is at least partially crystalline. This is advantageous since the ionic conductivity in the amorphous phase is generally higher than that in the crystalline phase. The following list contains examples of plasticising agents which may be mixed into a polymer for this purpose, the choice of agent depending on chemical compatibility and other factors:

Propylene carbonate
Ethylene carbonate
Tetramethylene sulphone (Sulpholane*)
$\gamma$-Butyrolactone
Dimethylformamide
Dioctyl phthalate
Dibutyl phthalate
Thiokol TP-90B* plasticiser (Thiokol Corporation)
Thiokol TP-759* plasticiser (Thiokol Corporation)
Vulkanol OT* plasticiser (Bayer UK Ltd) *Trade mark The amount of plasticising agent or agents to be added will depend on many factors, particularly the nature of the polymer and other components of the electrolyte, and the temperature. However, it is generally appropriate to add betwee 5 and 60% by weight, especially between 15 and 50%, more especially between 25 and 40%.

It is preferred to select a plasticising agent that has a relatively high dielectric constant to enhance dissociation of the ions of the salt, and thereby to improve ionic conductivity throughout the electrolyte. A dielectric constant of at least 15, preferably at least 20, especially at least 30, more especially at least 40 is preferred; for example, propylene carbonate (dielectric constant 64.4 at 25° C.), ethylene carbonate (89.6 at 40° C.) and tetramethylene sulphone (43.3 at 30° C.).

The invention includes electrodes for electrical devices carrying extruded polymeric electrolyte and electrical devices including such electrodes.

Suitable ionically conductive materials include inorganic salts dispersed in extrudable organic polymer material, preferably capable of permitting sufficient transfer of dissociated ions of the salt to provide the required ionic conductivity in the substantial absence of any liquid.

Examples include salt-loaded polymers having the repeating unit

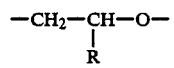

wherein R is hydrogen or a group $R_a$, $-CH_2OR_a$, $-CH_2OR_eR_a$, $-CH_2N(CH_3)_2$, in which $R_a$ is $C_1-C_{16}$, preferably $C_1-4$ alkyl or cycloalkyl, and $R_e$ is an ether group of formula $-(CH_2CH_2O-)p$ wherein p is a number from 1 to 100, preferably 1 or 2; or having the repeating unit

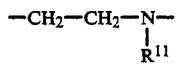

wherein $R^{11}$ is $R_a$, or $ReRa$, as defined above: or having the repeating unit

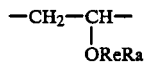

wherein Re and Ra are as defined above. The preferred salts are the strong acid salts of alkali metals or ammonium.

The extruded electrolyte preferably will not interact with the electrode materials, although beneficial interactions are not excluded from the invention.

Preferred processing conditions for polyethylene oxide to achieve polymer/salt complication using Brabender, twin-srew internal cavity mixer at 30 RPM for a 10:1 complex, include blending temperatures of greater than 100° C., ideally 140°-180° C., and not greater than 180° C. (to avoid polymer degradation). Total blending time less than 20 minutes is preferred to reduce possibility of polymer degradation.

For a Baker-Perkins MPC 30 compounding line, the optimum temperature on twin screw intensive mixing section is 120° C.; optimum temperature during extrusion; 150° C.

The following Examples illustrate aspects of this invention.

EXAMPLE 1

10 g polyethylene oxide (Union Carbide WSR 205) was dissolved in acetonitrile (pre-distilled) with stirring to give a 3% solution. The appropriate amount of the salt $LiCF_3SO_3$ (vacuum dried at 130° C. for 4 hours) to give a polymer oxygen lithium ion ratio (0:Li) of 10:1 was then added to the solution. The solution was then stirred at room temeprature for 4 hours.

Polymer film of thickness 0.2-0.3 mm was then solvent cast from the solution by placing the solution in a flat glass petrie dish and allowing the solvent to evaporate slowly. The films were then vacuum dried at 105° C. for 8 hours, before being placed in a vacuum desiccator and transferred to a dry box.

To ensure that the films remained totally anhydrous all subsequent handling operations on the materials were performed in the dry box.

The DSC trace of the film was precorded on a Dupont 1090 Thermal analyser operating in the DSC mode. FIG. 1 depicts the DSC trace obtained.

Figure 2:
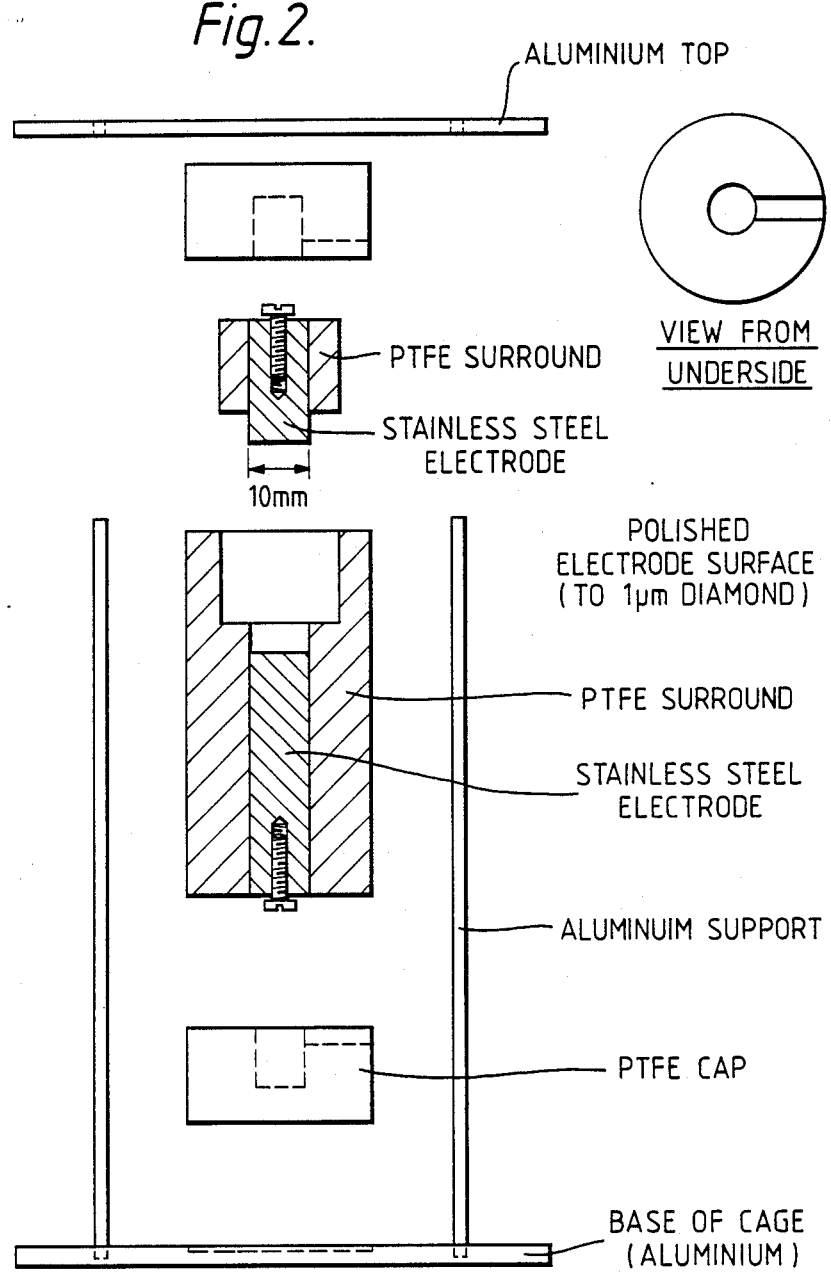
FIG. 2 shows a conductivity cell for measuring the conductivity of this invention.

The conductivity of the film was measured on a 0.85 cm diameter sample using the Griffin conductivity bridge operating at 1 k Hz and the conductivity cell shown in FIG. 2.

The conductivity at 100° C. was $2.4 \times 10^{-4} ohm^{-1} cm^{-1}$.

EXAMPLE 2

The appropriate amounts of poly(ethylene oxide) and salt $LiCF_3SO_3$, to give a 10:1 (0:Li) complex were mixed as powders and then melt blended on a Brabender twin screw cavity mixer at 160° C. for 20 minutes (30 RPM). The material was then pressed at 120° C. under 15 tonnes pressure to give a film of thickness 0.2-0.3 mm. The film was then dried and handled as described in Example 1.

Figure 3:
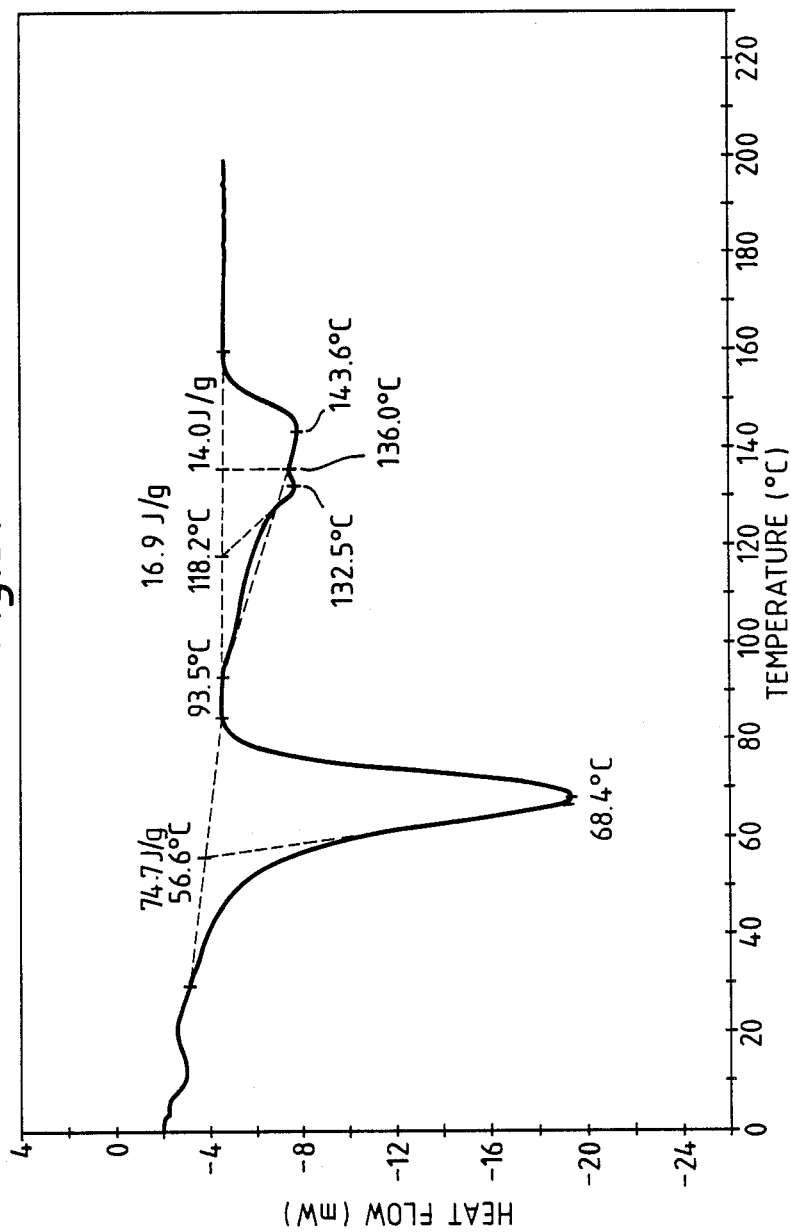

The DSC trace of the material is shown in FIG. 3 and is essentially the same as that obtained from the material in the previous example.

The conductivity of the film at 100° C. was $4.2 \times 10^{-4} ohm^{-1} cm^{1}$.

EXAMPLE 3

The material described in Example 2 was melt blended on a Baker-Perkins compounding line. The material was then formed into tape using a single screw extruder (32 mm Baughn single screw L/D ratio 25/1). The tape was produced in thickness 0.3-0.4 mm.

The tape was dried and handled as described in Example 1.

Figure 4:
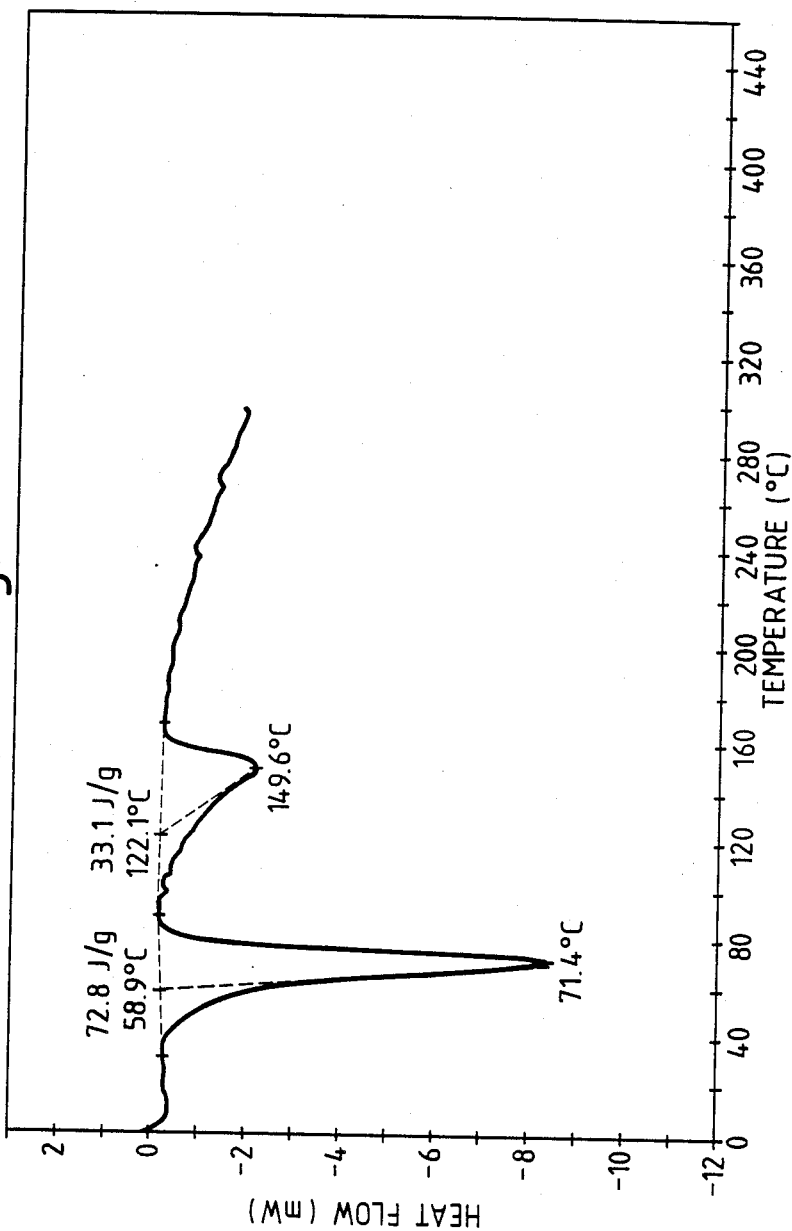

The DSC trace obtained is shown in FIG. 4, and is essentially the same as those obtained in the two previous examples.

The conductivity of the tape was measured using the method described in Example 1.

The conductivity of the tape at 100° C. was $2.1 \times 10^{-4} ohm^{-1} cm^{-1}$.

EXAMPLE 4

A length of lithium foil supplied by Foote Mineral Co., 35 mm wide 0.25 mm thick, was encapsulated with a blend of Polyox WSR 205 and $LiCF_3SO_3$ made as described in Example 3. The encapsulation was done by passing the lithium through a crosshead die mounted on a 32 mm single scew Baughn extruder and drawing a tube of the $Polyox/LiCF_3SO_3$ blend down on to it. The encapsulation was completed by drawing the composition between nip rollers immediately following extrusion. The resulting laminate had an overall thickness of 0.65 mm being composed of a lithium layer, 0.25 mm thick, coated on each side with a 0.2 mm thick layer of the Polyox, $LiCF_3SO_3$ blend.

The coating was removed from the lithium foil and its conductivity measured using the method described in example 1.

The conductivity of the coating at 25° C. was $2.5 \times 10^{-8}$ ohm$^{-1}$cm$^{-1}$, this compares with a value of $3.8 \times 10^{-8}$ ohm$^{-1}$cm$^{-1}$ obtained for the material described in Example 1.

EXAMPLE 5

23.8 grams of polyethylene oxide) was melted on a Brabender twin screw cavity mixer at 160° C. for 5 minutes (30 RPM). To the melt was then added 23.8 grams electrolyte manganese dioxide (Mitsubushi Corporation GS grade) previously dried for 4 hours at 375° C., and 2.4 grams acetylene black (Cairn Chemical Limited). The materials were then melt blended for a further 5 minutes to give a homogeneous mix.

A thin plaque of the composite cathode was fabricated from the mix by pressing at 120° C. under 15 tonnes pressure. The final plaque thickness was 0.15 mm.

EXAMPLE 6

The composite cathode described in Example 5 was used to fabricate an eletrochemical cell in the following way.

A 0.85 cm diameter disc was cut from the composite cathode plaque, dried at 110° C. under vacuum for 2 hours and then transferred to the dry box where all subsequent operations were performed.

A 0.1 cm diameter disc of the ionically conducting material described in Example 3 was sandwiched between the composite cathode and a 0.85 cm diameter disc of lithium metal, thickness 0.25 mm. This assembly was then pressed between spring loaded stainless steel electrodes to ensure good interfacial contact between the solid components of the electrochemical cell. The stainless steel electrodes also acted as external electrical connection for the electrochemical cell.

The electrochemical cell so described gave an open circuit voltage at 70° C. of 3.30 volt. When connected to a 100 K ohm external load the cell was capable of delivering 28 uA at 2.8 volt. Example 7

The appropriate amounts of poly(ethylene oxide) and salt LiCF$_3$SO$_3$, to give a 10:1 (0:Li) complex were mixed as powders and then melt blended on a Brabender turn screw cavity mixer at 160° C. for 15 minutes. 30% w/w propylene carbonate (Aldrich Chemical Co. Ltd.) was then added as the melt cooled. The resulting material was pressed at 80° C. under 15 tonnes pressure to give a film of thickness 0.5 mm.

The conductivity of the film at 23° C. was $1.84 \times 10^{-4}$ ohm cm$^{-1}$.

The above process was repeated to produce electrolytes containing ethylene carbonate and sulpholane. Conductivities of $1.45 \times 10^{-4}$ and $7.54 \times 10^{-5}$ ohm$^{-1}$ cm$^{-1}$ respectively were measured at 23° C.

EXAMPLE 8

The appropriate amounts of poly(ethylene oxide) and salt LiCF$_3$SO$_3$, to give a 30:1 (0:Li) complex were mixed as powders and then melt blended on a continuous basis, in a Leistritz twin-screw extruder. Pre-distilled propylene carbonate was added to the pre-formed polymeric electrolyte during a second extrusion stage. A precise and reproducible level of addition (34.5% w/w) was achieved by means of a calibrated reciprocating pump.

The conductivity of the polymeric electrolyte was $1.90 \times 10^{-4}$ ohm$^{-1}$ cm$^{-1}$.

Lithium metal was encapsulated as in example 4, prior to fabrication of electrochemical cells.

We claim:

1. A polymeric electrolyte material for use as an electrolyte in an electrochemical cell, comprising a blend of
   (a) an ionizable salt,
   (b) an extrudable organic polymer cpable of permitting sufficient transfer of dissociated ions of the salt so that the blend can function as an electrolyte in an electrochemical cell in the substantial absence of any liquid, and
   (c) a plasticizing agent which inhibits change in the morphology of the polymer from an amorphous phase to a crystalline phase.

2. A polymeric electrolyte material according to claim 1, wherein the plasticizing agent has a dielectric constrant of at least 15.

3. A polymeric electrolyte material according to claim 1, wherein the plasticizing agent has a dielectric constant of at least 30.

4. A polymeric electrolyte material according to claim 1, wherein the blend comprises between 5 and 60% by weight of the plasticizing agent.

5. A polymeric electrolyte material according to claim 1, wherein the blend comprises between 25 and 40% by weight of the plasticizing agent.

6. A polymeric electrolyte material according to claim 1, wherein the plasticizing agent is selected from the group consisting of propylene carbonate, ethylene carbonate, tetramethylene sulfone, gamma-butyrolactone, dimethylformamide, dioctyl phthalate, and dibutyl phthalate.

7. A polymeric electrolyte material according to claim 1, wherein the plasticizing agent is selected from the group consisting of propylene carbonate, ethylene carbonate, and tetramethylene sulfone.

8. A polymeric electrolyte material according to claim 1, wherein the ionizable salt is lithium trifluoromethanesulfonate.

9. A polymeric electrolyte material according to claim 1, wherein the polymer has the repeat unit $$-CH_2-CH-O-,$$
$$\phantom{-CH_2-}|\phantom{CH-O-}$$
$$\phantom{-CH_2-CH-O}R$$

$$-CH_2-CH_2-N-,$$
$$\phantom{-CH_2-CH_2-}|$$
$$\phantom{-CH_2-CH_2-N}R''$$

or $$-CH_2-CH-,$$
$$\phantom{-CH_2-}|$$
$$\phantom{-CH_2-}OR_eR_a$$

wherein R is hydrogen or a group $R_a$, $-CH_2OR_a$, $-CH_2OR_eR_a$ or $-CH_2N(CH_3)_2$ and R" is $R_a$ or $R_eR_a$, $R_a$ being a $C_1$ to $C_{16}$ alkyl or cycloalkyl group and $R_e$ being an ether group of the formula $-(CH_2CH_2O)_p-$ where p is a number from 1 to 100.

10. A polymeric electrolyte material according to claim 1, wherein the polymer is poly(ethylene oxide).

* * * * *